J. P. ADAMS.
Butter Worker.
No. 51,408. Patented Dec. 12, 1865.
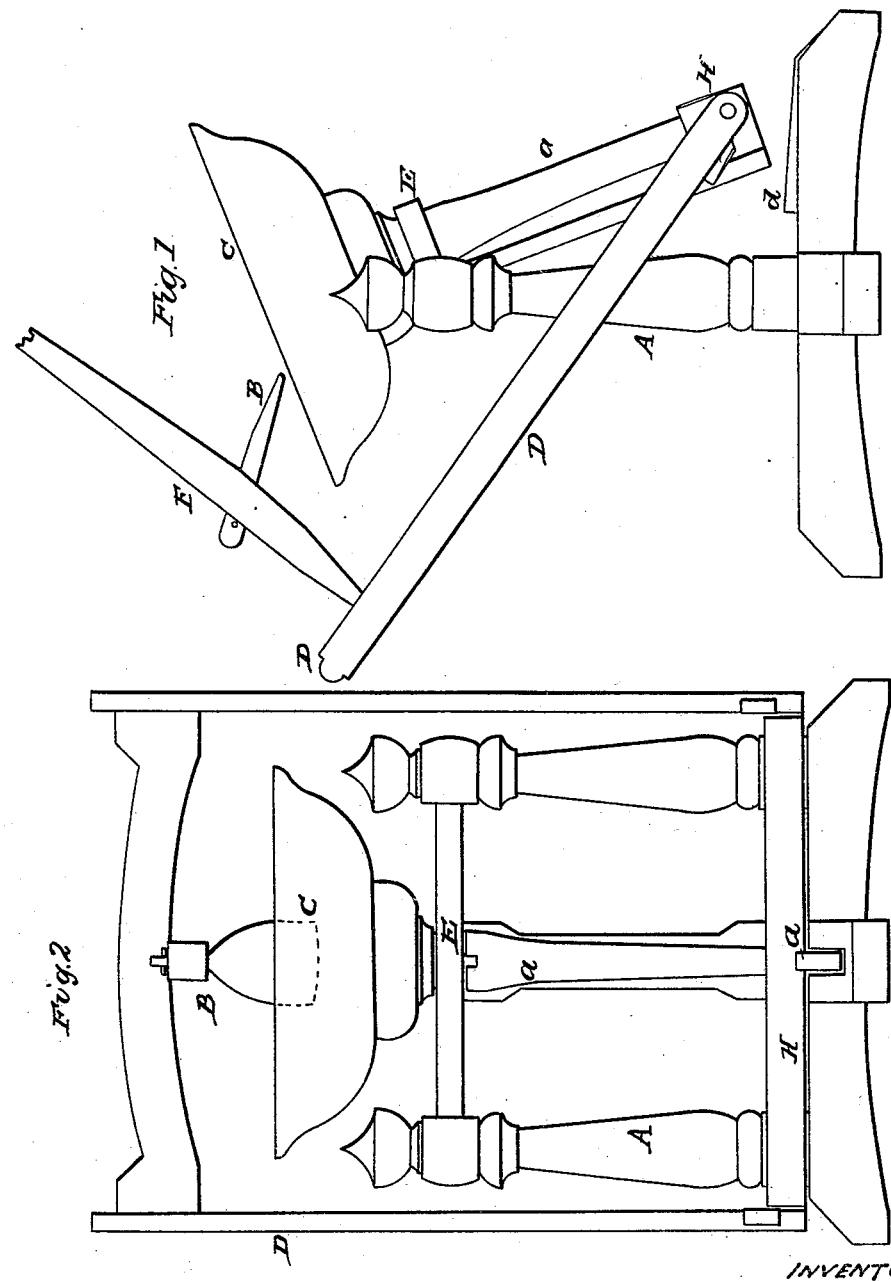

UNITED STATES PATENT OFFICE.

J. P. ADAMS, OF WHITNEY'S POINT, NEW YORK.

IMPROVEMENT IN BUTTER-WORKERS.

Specification forming part of Letters Patent No. 51,408, dated December 12, 1865.

*To all whom it may concern:*

Be it known that I, J. P. ADAMS, of Whitney's Point, county of Broome, State of New York, have invented certain new and useful Improvements in Butter-Workers; and I hereby declare that the following is a full, clear, and exact description of the same, reference being had to the accompanying drawings, and the letters of reference marked thereon, making a part of this specification.

In the accompanying drawings, A represents the frame of the butter-worker, which consists of two pieces of wood set into each other at their centers and crossing at right angles. On one of the pieces an upright is placed at each end.

E represents a turning bar, which is secured into the two uprights and is made to revolve. Passing through the bar E is a shaft, $a$, which has its bearing upon the lower brace of the swinging frame D D, as seen at H.

The bowl C rests upon the shaft $a$, and is so constructed as to be taken off or placed on the shaft, as desired.

D D represents the swinging frame, which is made in the form as shown, and connected by pivots in each of the ends of the brace H, so as to allow the frame to be moved back and forth, while the brace H is stationary.

F is a lever-handle, to which is set a paddle, B, to work the butter. The handle is attached near or at the center of the top portion of the frame D D.

The shaft on which the bowl is placed is kept in a vertical position by the spring $d$ in the bottom of the frame. By pressing upon the spring the frame D D and bowl C may be made to make a quarter-revolution upon the bar E as an axis, and empty the milk, water, &c., from the bowl. By replacing the frame in its former position it is securely held by the spring, so when the handle is working the butter the brace H is stationary, and the lever is allowed to swing to and fro for the purpose of more easily working the butter. In Fig. 1 the worker is seen with the swinging frame D D and bowl C in an oblique position, while in Fig. 2 the worker is seen as in use for working the butter. By drawing the handle back and pressing it forward the paddle passes back and forth in the bowl and presses the milk and water out of the butter. The bowl C is revolved while the paddle is working backward and forward.

Having thus fully described my invention, what I claim as new, and desire to secure by Letters Patent, is—

The arrangement of the frame A, the spring $d$, and the swinging frame D, substantially as and for the purpose specified.

J. P. ADAMS.

Witnesses:
C. W. ALEXANDER,
J. M. MASON.